United States Patent
Cox et al.

[11] Patent Number: 5,751,838
[45] Date of Patent: May 12, 1998

[54] CORRECTION OF CAMERA MOTION BETWEEN TWO IMAGE FRAMES

[75] Inventors: Ingemar J. Cox, Lawrenceville; Sebastien Roy, Pennington, both of N.J.

[73] Assignee: Nec Research Institute, Inc., Princeton, N.J.

[21] Appl. No.: 592,249

[22] Filed: Jan. 26, 1996

[51] Int. Cl.$^6$ ........................................... G06K 9/36
[52] U.S. Cl. ........................ 382/107; 382/103; 348/571; 348/155
[58] Field of Search ........................ 382/107, 103, 382/236, 295, 296; 348/407, 413, 431, 571, 155; G06K 9/36

[56] References Cited

U.S. PATENT DOCUMENTS

| | | | |
|---|---|---|---|
| 5,259,040 | 11/1993 | Hanna | 382/107 |
| 5,436,672 | 7/1995 | Medioni et al. | 382/591 |
| 5,611,000 | 3/1997 | Szeliski et al. | 382/293 |

*Primary Examiner*—Thomas L. Stoll
*Attorney, Agent, or Firm*—Jeffrey J. Brosemer; Philip J. Feig

[57] ABSTRACT

A technique for determining the ego-motion between two frames of an image that includes estimating likely values of the translation and rotation and making a five-dimensional search over the space of likely translations and rotations and finding the global minimum at the current motion estimate by a sum of squared differences cost function.

8 Claims, 2 Drawing Sheets

CORRECTION OF CAMERA MOTION BETWEEN TWO IMAGE FRAMES

FIELD OF THE INVENTION

This invention relates to computer vision and more particularly to the estimation of the ego-motion and structure of a scene from two image frames of the scene.

BACKGROUND OF THE INVENTION

The estimation of ego-motion and structure from two image frames of a scene has utility in many domains, especially navigation and three dimensional scene reconstruction.

Much work has been done on trying to recover camera motion parameters from image pairs. In almost all cases, either optical flow or feature points correspondence are used as the initial measurements. In the first case, some inherent problems (aperture, large motions, etc.) related to optical flow computations, suggests that errors can never be lowered to a negligible level. Even methods using the intensity derivatives directly or normal flow, suffer from high noise sensitivity. For feature-based methods, the reliable selection and tracking of meaningful feature points is generally very difficult.

Prior art methods of ego-motion implicitly or explicitly determine the structure present in the scene. For example, while feature-based methods compute a motion estimate directly, the structure is implicitly available given the feature correspondences. Direct methods explicitly estimate both the ego-motion and structure, typically in an iterative fashion, refining first the motion and then the structure estimates, etc. Thus, good motion estimation appears to require good structure estimation (or at least point correspondence estimation).

In our prior application Ser. No. 08/414,397, filed on Mar. 31, 1995, now U.S. Pat. No. 5,644,654 and assigned to the same assignee as the instant application, there is described a method for determining the ego-motion and structural form of a scene from two image frames of the scene that is based on a search through either the three-dimensional space based on rotation and an assumed known translation or the two-dimensional space based on translation and an assumed known rotation associated with the scene. This method uses the properties of intensity histograms computed along epipolar lines that can be supposed to be corresponding. These properties depend on the assumption of constant image brightness so that one can assume that the histograms of corresponding epipolar lines are invariant and that the histograms of almost corresponding lines are similar, the similarity being a function of the spatial correlation present in the images. The property that the difference between two histograms of two epipolar lines is a minimum when the two epipolar lines truly correspond and increases monotonically with the degree of misalignment between two epipolar lines allows the rotational motion between the two image frames to be estimated in a straight-forward manner in a three-dimensional epipolar search assuming the translational motion is known. The estimate derived of the amount of rotation between the two image frames may then be used in further processing of the frames to generate a three-dimensional representation of the image scene.

This method has proved to be quite accurate in providing estimates of rotational motion involved between two image frames but has proved relatively noisy in providing estimates of translational motion and the present invention is a method that is highly accurate both for translational and rotational estimates.

SUMMARY OF THE INVENTION

The present invention is based on a paradigm that might be called motion-without-structure that allows the recovery of ego-motion independently of any structure or correspondence estimation. The benefit of this is that there are exactly five unknown motion parameters to be estimated. As such, we expect that such an approach should be both robust and accurate. Initial experimental results support this.

The method relies on statistically modelling the image behavior in the neighborhood of a point. This model is then used to estimate the likelihood of an assumed camera motion.

Determining the true motion search is straightforward since the function to minimize has only one minimum (which is the solution), provided the image is well-behaved, i.e. the variance of the intensity difference of neighboring intensity points increases monotonically with the distance between the points.

Our goal is to determine the motion between two frames by a search over the space of possible rotations and translations. The number of parameters to be estimated are 3 for rotation and 2 for translation. Only two translational components are needed because the magnitude of the translation cannot be estimated, only its direction (due to the scale ambiguity). The translation is assumed then to have unit magnitude and the estimation of translation reduces to determination of the direction of translation on the surface of a unit sphere.

In order for such a search to be possible, a cost function is needed that evaluates the likelihood of an assumed motion. Essential characteristics of such a cost function are (1) invariance to structure in the scene, (2) a well defined global minimum at the correct motion estimate and (3) no local minima or at least a locally smooth, preferably monotonic variation as a function of the error in motion estimates.

Below we describe one such structure-invariant evaluation function that derives a figure of merit based on a form of sum of squared differences. More specifically, the figure of merit based on a global sum of a slim of squared errors between pixels of one image and sample points along the assumed (corresponding epipolar line segments in the other image. To derive this cost function, we introduce a simple statistical model of the local intensity variation in the images. It can be shown that when such a model is valid, then the evaluation function is both monotonically decreasing and possesses a single well defined global minimum. Experimental results on several natural scenes support this.

In particular, the process of the invention involves making an estimate as discussed above involving three rotation parameters and two translational parameters. A cost function is used to evaluate each estimate that involves the sum of squared differences between pixels in one image and corresponding pixels in hypothesized corresponding epipolar line segments. A gradient descent search is used to choose different estimates until a minimum sum is reached that generally will be the desired global minimum.

In instances where the constant image intensity assumption is inapplicable, it may be desirable to preface the process described above by normalization. The normalization advantageously can be done by a dynamic histogram warping technique.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

A simple statistical model is used to represent image behavior around a point. Consider the intensity distribution in the neighborhood of a given point $\vec{p}$, in a single image A. We assume that the probability of a point $I_A(\vec{p}+\vec{\delta})$ having intensity a conditioned on a given point $\vec{p}$ with intensity b has a Normal distribution, assuming the distance between the two points is sufficiently small. Thus we have $$P(I_A(\vec{p}+\vec{\delta}) = a | I_A(\vec{p}) = b) = G_{[b,\sigma^2(\vec{\delta})]}(a) = \frac{1}{\sqrt{2\pi\sigma^2(\vec{\delta})}} e^{-((a-b)^2/2\sigma^2(\vec{\delta}))} \quad (1)$$

where $G_{[b;\sigma^2(\vec{\delta})]}9(x)$ is a Gaussian distribution with mean b and variance $\sigma^2(\vec{\delta})$. The variance $\sigma^2(\vec{\delta})$ is a function of the distance $\|\vec{\delta}\|$. This property is intuitively related to the correlation present in a scene and is experimentally verified next.

For a given image, we can evaluate the parameters of the distributions, namely $\sigma^2(\vec{\delta})$, for all possible separations $\vec{\delta}$ within a selected neighborhood. For a given $\vec{\delta}$, we wish to evaluate the distribution of the samples $$s_i(\vec{\delta}) = I_A(\vec{p}_i + \vec{\delta}) - I_A(\vec{p}_i), 1 \leq i \leq n$$

taken over all $\vec{p}_i$ points in the image. Note that the mean of this sample is always 0. The variance $\sigma^2(\vec{\delta})$ is obtained from the samples as $$\sigma^2(\vec{d}) = \frac{1}{n-1} \sum_n S_i(\vec{\delta})^2 = \frac{1}{n-1} \sum_n I_A(\vec{p}_i + \vec{\delta}) - I_A(\vec{p}_i) \quad (2)$$

where n is the number of samples taken.

Once the variance is estimated for all $\vec{\delta}$ such that $\|\vec{\delta}\| \leq r_{max}$ where $r_{max}$ is the maximum size of the neighborhood, we have a useful global statistic that describes the local behavior of image intensities. This statistic is experimentally determined by directly measuring the distribution of intensity values in the neighborhood of all pixels in an image. We have found that for the typical natural image the variance increases approximately monotonically with distance, with a single minimum centered at $\vec{\delta}=(0,0)$. This property is exploited to derive the likelihood measure. While the relationship between variance and distance is monotonically increasing, it is not isotropic, indicating that intensities are more correlated in certain directions.

Figure 1:
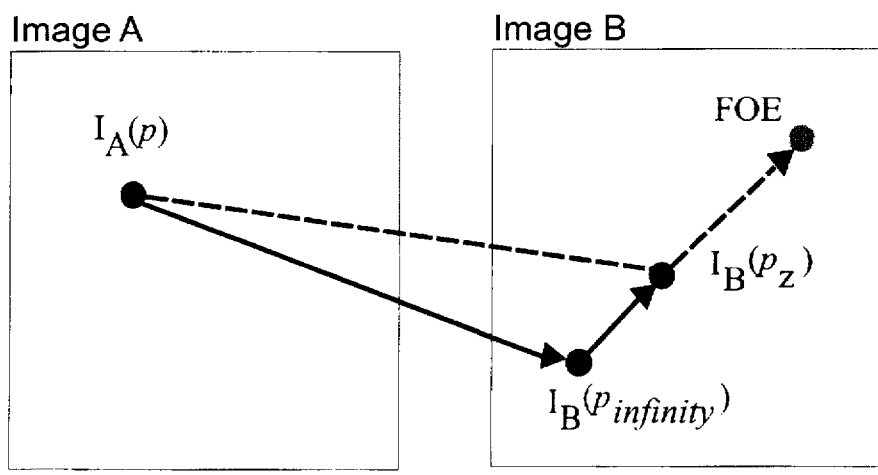
FIG. 1 shows two frames of a scene that have experienced a motion in which Image B shows the locus of the possible positions of a point shown in Image A.

We can now proceed to develop a depth-invariant cost function. If the rotation is known, then it is necessary to evaluate the likelihood of an assumed translation T, and vice versa for rotation R. With reference to FIG. 1, for a given point $I_A(\vec{p})$ in image A and a camera motion, we can compute the corresponding point $I_B(\vec{p}_\infty)$ (the zero-disparity point) in image B that has infinite depth, as well as the focus of expansion (FOE). A known translation but unknown rotation implies that the FOE is known but the point $I_B(\vec{p}_\infty)$ has an unknown location. Conversely, a known rotation but unknown translation implies that the corresponding point $I_B(\vec{p}_\infty)$ in image B is known but the location of the FOE is not. Since we do not know the real depth of point $I_A(\vec{p})$, we can only assume that the actual corresponding point $I_B(\vec{p}_z)$ is somewhere in the neighborhood of point $I_B(\vec{p}_\infty)$, depending on the unknown depth z. In fact, it is always located on the line joining the true $I_B(\vec{p}_\infty)$ and the true focus of expansion. Since the points $I_A(\vec{p})$ and (the unknown) $I_B(\vec{p}_z)$ correspond, the variance function around $I_B(\vec{p}_z)$ should be identical to that of $I_A(\vec{p})$.

For the case of unknown translation, a line segment, u, of length $r_{max}$ is selected starting at the zero-disparity point $I_B(\vec{p}_\infty)$ and oriented toward the candidate FOE. The value of $r_{max}$ is chosen to reflect the maximum disparity expected. A candidate FOE provides a candidate translation and vice versa. If we select a number of sample intensity values $u_i$ along the segment u and define the error measure $e_u$ as $$e_u = \sum_{i=1}^{n} (u_i - I_A(\vec{p}))^2 \quad (3)$$

then $e_u$ will be a minimum when the segment u contains $I_B(\vec{p}_z)$, and thus points towards the FOE. This minimum exists and is unique when the variance function of the images is well-behaved. This is discussed in more detail below.

We can now use this property to estimate if a candidate FOE is good. If we select a number of points $I_A(\vec{p}_i)$ and compute the sum of the individual line segment error measures $e_{qi}$ where $q_i$ is the segment starting at $I_A(\vec{p}_i)$ and pointing toward the candidate FOE, we expect all these error measures to be simultaneously a minimum if this candidate FOE is indeed the true FOE. We thus use the sum of the individual line segment error measures $S=\Sigma e_{qi}$ as a global estimate of the likelihood of the FOE. In the case of well-behaved images, we expect only one minimum and can do a simple search for the exact FOE based on gradient descent.

It is easy to change this method to estimate rotation by fixing the FOE (known translation) and selecting candidate points $I_B(\vec{p}_{z\delta})$ associated with candidate rotations.

In order to successfully search over the motion space, the cost function must have a well defined global minimum and few, if any, local minima. We can show that for a known rotation, the translational search space features only a single global minimum, assuming uniform and monotonic image intensity correlation. The converse is also true. In both of these cases, there is no problem with rotation/translation ambiguity as is the case in the full 5D search.

A second condition for successful search, is that the region of convergence should be large to allow easy selection of an initial search point. This region (and the general smoothness of the function) should be derivable from the local image intensity statistics. Qualitatively, it is clear that high frequency intensity variations do not allow a wide region of convergence (because of ambiguities) while low frequency variations allow for much larger motions.

We now show that for well-behaved images, a single minimum of the error measure $e_u$ of Equation 3 is observed when a segment u contains $I_B(\vec{p}_z)$ and joins the true zero-disparity point and the true FOE. We define a well-behaved image as one that possesses a monotonically increasing variance function. Since by definition this function always has a global minimum at (0,0), this condition is enough to insure that the likelihood function possesses a unique minimum. This is demonstrated next.

Figure 2A:
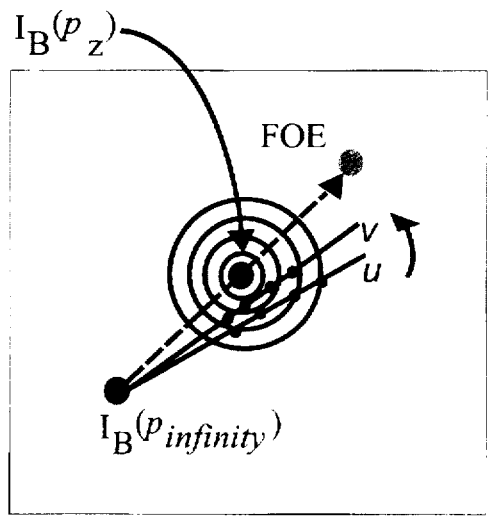
FIGS. 2A and 2B show the error function for two segments u and v for the case of unknown translation and unknown rotation, respectively.
Figure 2B:
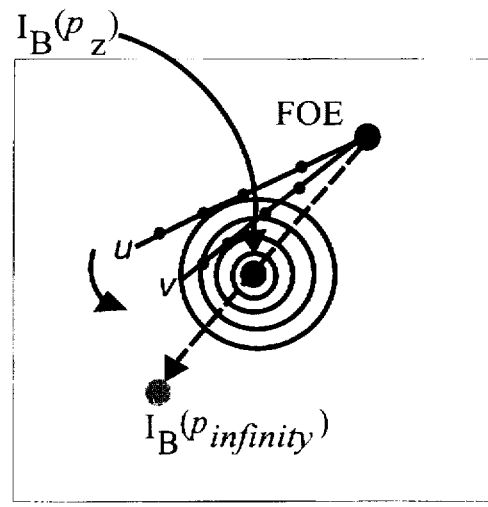

Consider a segment u in the neighborhood of $\vec{p}_z$, starting at $\vec{p}_\infty$, and contain g n sample intensities, as depicted in FIG. 2A. Then from the distribution property we can say that each sample behaves like a random variable $u_i$ with distribution $$f(u_i) = G_{[I_A(\vec{p}); \rho^2(\vec{d}_p)]}(u_i)$$

where $\vec{d}_{u_i}$ is the distance (x,y) from sample $u_i$ to position $\vec{p}_z$, the unknown location of the corresponding point to $I_A(\vec{p})$. From Equation 3, the error measure $e_u$ is a random variable defined as $$e_u = \sum_{i=1}^{n} (u_i - I_A(\vec{p}))^2$$

with an expectation value defined as $$E(e_u) = E\left( \sum_{i=1}^{n} (u_i - I_A(\vec{p}))^2 \right) = \sum_{i=1}^{n} \sigma^2(\vec{d}_{u_i})$$

Suppose we now take a second segment v starting also at $\vec{p}_\infty$, but closer to the point $\vec{p}_z$. A set of samples $v_i$ is chosen with the same sampling as segment u. The error measure $e_v$ is defined as the random variable $$e_v = \sum_{i=1}^{n} (v_i - I_A(\vec{p}))^2$$

which has an expected value $$E(e_v) = \sum_{i=1}^{n} \sigma^2(\vec{d}_{v_i})$$

where $\vec{d}_{v_i}$ is the distance (x,y) from sample $v_i$ to position $\vec{p}_z$. We now wish to show that the expectation of $e_v$ is always smaller than $E(e_u)$. First, it is straightforward to see that $$\|\vec{d}_{v_i}\| < \|\vec{d}_{u_i}\|, \forall i.$$

It then follows that $$E(e_v) = \sum_{i=1}^{n} \sigma^2(\vec{d}_{v_i}) < \sum_{i=1}^{n} \sigma^2(\vec{d}_{u_i}) = E(e_u)$$

which shows that as we get closer to the segment containing $I_B(\vec{p}_z)$, the expected error value gets smaller until it reaches a minimum when the candidate FOE corresponds to the true FOE. As long as the variance function is monotonic, this minimum is guaranteed to exist and is unique.

The same procedure can be applied for rotation estimation, just reversing the FOE and the zero-disparity point.

Figure 3:
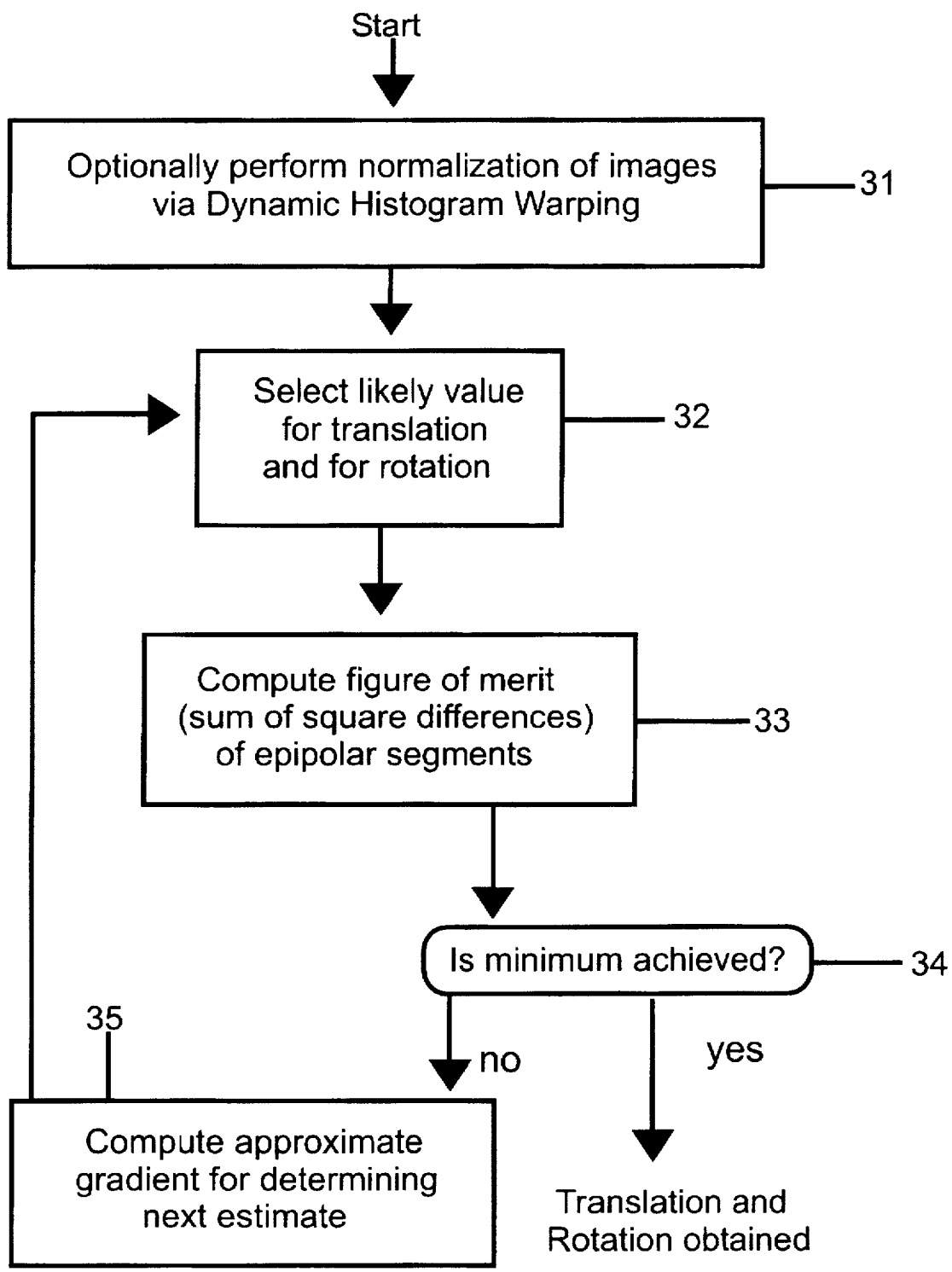
FIG. 3 is a flow chart of the process of the invention.

In FIG. 3, there is shown a flow chart of the procedure. As indicated by block 31, in those cases where there is a wide difference in the intensity levels between the two frames being compared because of camera adjustments or varying illumination conditions, finding the desired global minimum in the cost function being used can be expedited if the intensity levels of the two frames are normalized. Dynamic histogram warping is a known technique for normalization. This technique involves preparing histograms of the intensity levels of one or both of the images so that the peaks in the two histograms occur at about the same intensity levels. Alternatively, any other suitable normalization technique, such as histogram specification, may be used.

Once such normalization has been done, the next step 32 involves estimating the five parameters that correspond to an assumed camera motion. The next step 33 involves computing the figure of merit of the assumed motion in the manner using the sum of square differences of epipolar segments.

The process continues by replicating steps 32 and 33 until a minimum is found, indicated as step 34. Subsequent estimates are chosen using the known gradient descent technique indicated as step 35.

The search is implemented with a gradient-based approach. We compute an approximation to the gradient by comparing values of the function around a given point, in all dimensions. The steps used are ±5° on the unit sphere for translation and ±1° for rotation. This approximate gradient is then normalized to between 0.02° and 0.10° which is then used to update the current minimum. The method usually needs around 60 to 100 iterations to converge to the solution. We anticipate that considerable improvement could be made to this search method, since no emphasis has yet been put on speed.

Since we use a gradient descent technique to find the solution, the initial estimate is very important. In all experiments conducted, care was taken to select realistic initial estimates, i.e. as far as possible from the solution while taking into account the convergence constraint derived from the image texture. It is important to note that in most practical situations of motion tracking, the motion parameters from the previous frame should be used as an initial estimate for the next frame, taking advantage of the fact that motion tends to be similar and thus allowing faster convergence. Except when it is completely outside the convergence region, the only impact of the initial estimate is on the speed of convergence to the solution.

Typically up to 25 samples are taken along each hypothesized corresponding segment and used in Equation 2 to compute the likelihood. For most images, only a few hundred points are needed to generate useful results that can be used to quickly find a good estimate. By increasing the number of points used, the accuracy of the estimation is also increased.

The evaluation function for any hypothesized motion does not rely on image gradients and consists of accumulating a large amount of intensity difference information. We therefore expect this measure to be very robust to noise, i.e. good accuracy is expected even under noisy conditions.

Our experimental results indicate that the relationship between the image noise level and the rotation angle error is approximately linear, implying that doubling the image noise will result in doubling the error on the estimated rotation angle.

These results clearly indicate that our technique is very resistant to incorrelated noise. It is likely to be poorer for correlated noise, such as a single camera with a dirty lens.

We presented a new paradigm to find the full motion between two frames. The approach is referred to as "motion without structure" because it does not require or compute any information related to the structure of the scene. The motion analysis problem is posed as a search in the space of possible motions and a likelihood measure developed that evaluates an hypothesized motion based on the sum of sum of squared differences between points in one image and their corresponding epipolar segments in the other.

This likelihood function was shown to exhibit exactly one global minimum for the cases of either known rotation or known translation, provided the images are well-behave, i.e. that the variance of intensity difference between two points is a monotonically increasing function of their distance apart. In the full motion case, a unique global minimum also exist, but may be subject to the well known ambiquity between rotational and translational motion.

Experimental results suggest that the method is applicable to a wide range of images while achieving very good accuracy and presenting strong robustness to noise. Large frame-to-frame motions can be handled and are only limited by the characteristics of the local intensity variation present in the image.

Clearly, it should now be quite evident to those skilled in the art, that while our invention is shown and described in detail in the context of a preferred embodiment, and with various modifications thereto, a wide variety of other modifications can be made without departing from the scope of our inventive teachings.

What is claimed is:

1. A process for determining ego-motion between two image frames of a scene that includes the steps of:

estimating the two parameters of translation and three parameters of rotation involved in camera ego-motion based upon pixels in one frame and corresponding epipolar line segments in the other frames;

computing the cost function of the estimated movement; and revising the estimate and computing the cost function in iterative fashion to find the estimate that results in the cost function with the least figure of merit for use as the desired ego-motion.

2. The process of claim 1 in which the cost function depends on the sum of squared differences between pixels of one image and sample points along the assumed corresponding epipolar line segments in the other image.

3. The process of claim 1 that includes as a preliminary stop the normalization of the pixel intensity levels of the two frames.

4. The process of claim 3 in which the normalization is done by dynamic histogram warping.

5. A method for deriving a measure of the camera translation involved between two image frames of a given scene that have an assumed known rotation and an unknown translation comprising the steps of:

selecting a point A in the first frame;

computing the corresponding zero disparity point in the second frame;

selecting a plurality of different line segments that pass through the zero disparity point and are oriented as possible candidates for the focus of expansion;

selecting a number of points on each of the line segments;

calculating the error measures of each of the selected lines for finding the one with the minimum error; and using the one with the minimum error for identifying the true focus of expansion.

6. A method for deriving a measure of the camera rotation involved between two image frames of a given scene that have an assumed known translation and an unknown rotation comprising the steps of:

selecting a point A in the first frame;

computing the corresponding zero disparity point in the second frame;

selecting a plurality of different line segments that pass through the possible candidate zero disparity points and are oriented according to the focus of expansion;

selecting a member of points on each of the line segments;

calculating the error measures of each of the selected lines for finding the one with the minimum error; and using the one with the minimum error for identifying the true focus of expansion.

7. The process of claim 5 that includes as a preliminary step the normalization of the pixel intensity levels of the two frames.

8. The process of claim 6 that includes as a preliminary step the normalization of the pixel intensity levels of the two frames.

* * * * *